(12) United States Patent
Behnke

(10) Patent No.: US 6,810,936 B2
(45) Date of Patent: Nov. 2, 2004

(54) METHOD AND APPARATUS FOR SEALING COVER TAPE TO CARRIER TAPE

(75) Inventor: Merlin E. Behnke, Grafton, WI (US)

(73) Assignee: International Product Technology, Inc., New Berlin, WI (US)

(*) Notice: Subject to any disclaimer, the term of this patent is extended or adjusted under 35 U.S.C. 154(b) by 0 days.

(21) Appl. No.: 10/287,878

(22) Filed: Oct. 30, 2002

(65) Prior Publication Data

US 2003/0079842 A1 May 1, 2003

Related U.S. Application Data

(60) Provisional application No. 60/340,978, filed on Oct. 30, 2001.

(51) Int. Cl.[7] .............................................. B30B 15/00
(52) U.S. Cl. .................... 156/582; 156/292; 156/308.2; 156/499; 156/555
(58) Field of Search ................................ 156/290, 292, 156/308.2, 308.4, 309.6, 499, 555, 580, 582, 583.1

(56) References Cited

U.S. PATENT DOCUMENTS

| | | | |
|---|---|---|---|
| 3,908,342 A | | 9/1975 | Raque |
| 4,123,313 A | * | 10/1978 | Queen et al. ............... 156/498 |
| 4,563,855 A | | 1/1986 | Smith et al. |
| 4,769,102 A | * | 9/1988 | Neumuller et al. ......... 156/359 |
| 4,922,682 A | | 5/1990 | Tait et al. |
| 5,057,169 A | | 10/1991 | Adelman |
| 5,345,747 A | | 9/1994 | Raque et al. |
| 5,371,998 A | | 12/1994 | Johnson et al. |
| 5,729,963 A | | 3/1998 | Bird |
| 6,129,809 A | | 10/2000 | Ellenberger et al. |
| 6,153,033 A | * | 11/2000 | Kriefske et al. .............. 156/70 |
| 6,378,589 B1 | * | 4/2002 | Struve ........................ 156/499 |
| 6,390,168 B1 | * | 5/2002 | Struve ........................ 156/499 |

FOREIGN PATENT DOCUMENTS

| | | |
|---|---|---|
| EP | 0 179 454 | 4/1986 |
| EP | 0 450 713 | 10/1991 |

* cited by examiner

*Primary Examiner*—James Sells
(74) *Attorney, Agent, or Firm*—Michael Best & Friedrich LLP

(57) ABSTRACT

Method and apparatus for sealing cover tape. A sealing mechanism is connected to an actuator that moves the mechanism toward an adhesively backed cover tape and a carrier tape. The sealing mechanism applies heat and/or pressure to the cover tape to activate and bond the cover tape to the carrier tape. A biasing member biases the mechanism away from the cover and carrier tapes. The actuator is actuable to overcome the biasing force of the biasing member and to initiate contact between the sealing mechanism and the cover tape. When the actuator is disengaged, the biasing member moves the sealing mechanism away from the cover tape.

38 Claims, 4 Drawing Sheets

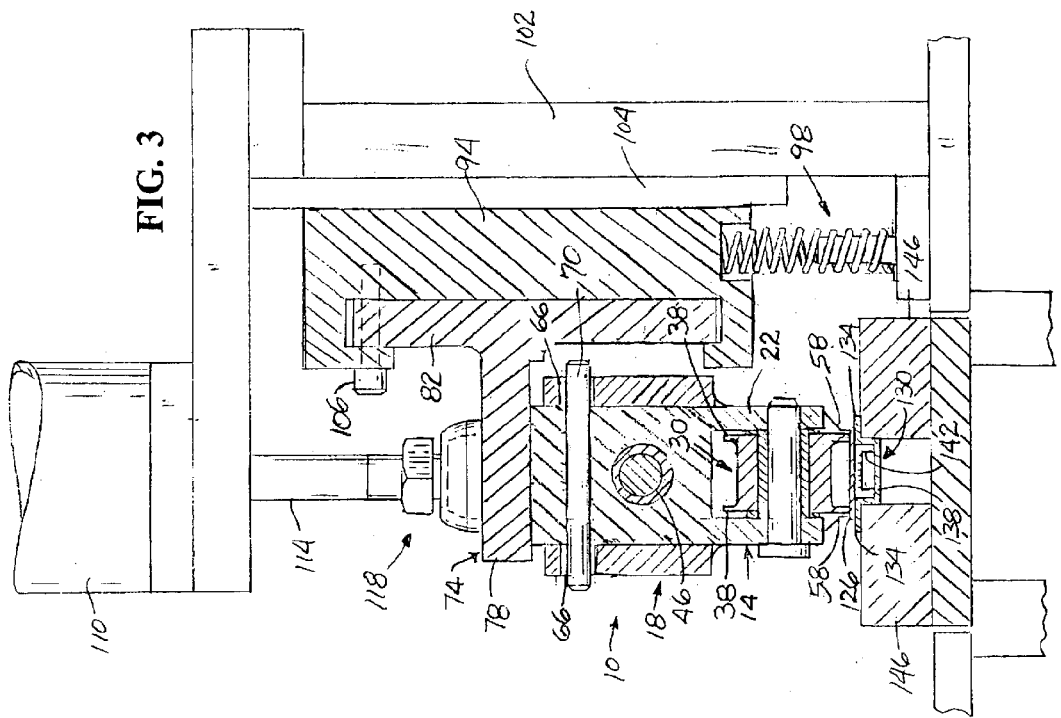
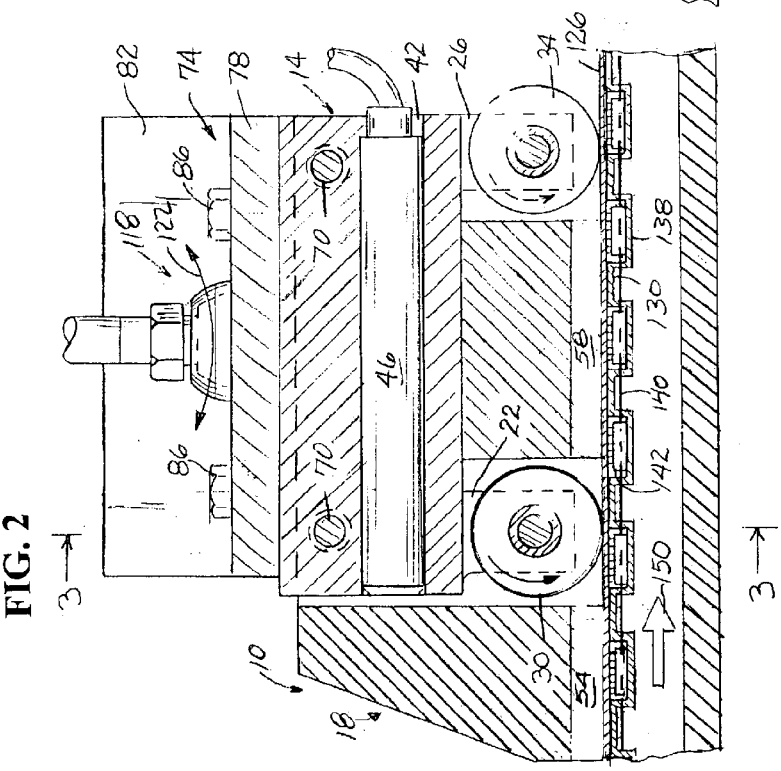

METHOD AND APPARATUS FOR SEALING COVER TAPE TO CARRIER TAPE

This application claims benefit of Provisional application No. 60/340,978 filed Oct. 30, 2001.

BACKGROUND OF THE INVENTION

This invention relates to a method and apparatus for sealing cover tape to carrier tape and, more particularly, to a sealing mechanism that applies heat and/or pressure to seal the cover tape to the carrier tape.

SUMMARY OF THE INVENTION

The invention provides a sealing mechanism that is connected to an actuator that moves the mechanism toward an adhesively backed cover tape and a carrier tape. If the adhesive is heat sensitive, the sealing mechanism applies heat to the cover tape to transform the adhesive into a molten state. The sealing mechanism applies pressure through sealing wheels to press the cover tape against the carrier tape, thereby bonding the heat sensitive or pressure sensitive adhesive between the carrier tape and cover tape. A biasing member biases the mechanism away from the cover and carrier tapes. The actuator is actuable to overcome the biasing force of the biasing member and to initiate contact between the sealing mechanism and the cover tape. When the actuator is disengaged, the biasing member moves the sealing mechanism away from the cover tape.

BRIEF DESCRIPTION OF DRAWINGS

FIG. 2 is a section view of the sealing mechanism of FIG. 1.

FIG. 3 is a section view taken along line 3—3 in FIG. 2.

DETAILED DESCRIPTION OF THE INVENTION

Figure 1:
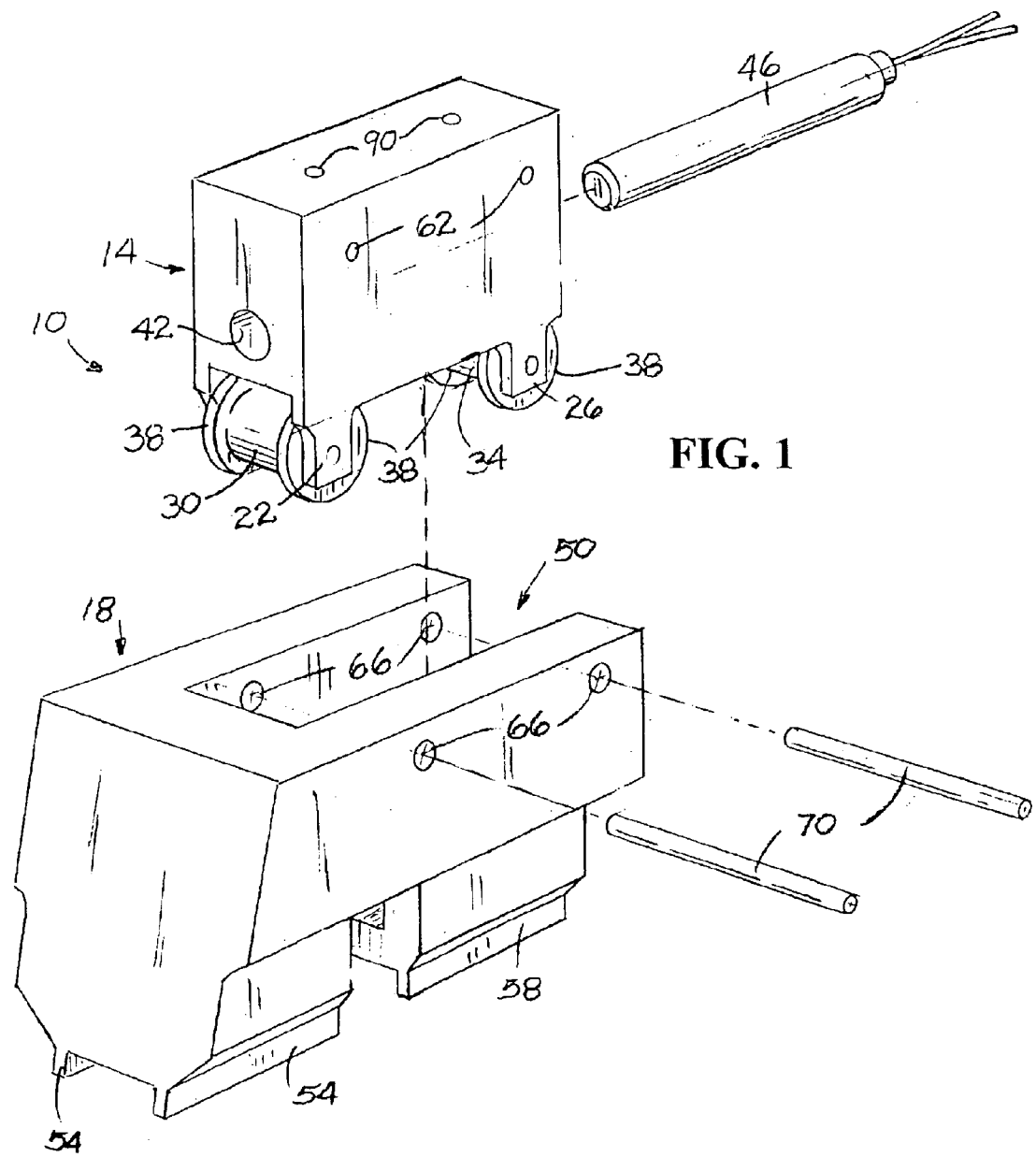
FIG. 1 is an exploded perspective view of a sealing mechanism embodying the invention.

FIG. 1 illustrates a sealing mechanism 10 that includes a truck 14 and a shoe 18. The truck 14 includes front and rear depending tabs 22, 26 to which front and rear wheels 30, 34 are rotatably mounted. The wheels 30, 34 are generally spool-shaped and include side edges or flanges 38. The truck 14 also includes a cavity or bore 42 into which a heating element 46 may be inserted. The shoe 18 includes a central cavity 50 and front and rear rails 54, 58 along its bottom edge.

With reference to FIGS. 1–3, the truck 14 is inserted into the central cavity 50, and the front wheel 30 of the truck 14 extends through an opening in the middle of the shoe 18 between the front and rear rails 54, 58. The rear wheel 34 of the truck 14 trails behind the rear rails 58 of the shoe 18 when the truck 14 and shoe 18 are assembled. When assembled, the flanges 38 of the truck's wheels 30, 34 are generally aligned or coplanar with the rails 54, 58 of the shoe 18, although the rails 54 are slightly wider than the flanges 38 of the truck's wheels 30, 34.

As seen in FIGS. 1 and 3, the truck 14 and shoe 18 each include a pair of holes 62, 66, respectively. Pins 70 extend through the matching sets of holes 62, 66 to couple the truck 14 and shoe 18 together. The holes 62 in the truck 14 snugly receive the pins 70, while the holes 66 in the shoe 18 are oversized or of larger diameter than the pins 70 so that there is play between the shoe 18 and the pins 70. This play permits the shoe 18 to float up and down with respect to the truck 14.

Turning to FIGS. 2 and 3, an actuator bracket 74 is mounted to the truck 14. The actuator bracket 74 is generally T-shaped in cross-section as seen in FIG. 3, and includes a base 78 and a cross-bar 82. Threaded fasteners 86 extend through holes in the base 78 of the actuator bracket 74 and are threaded into threaded holes 90 (see FIG. 1) in the top of the truck 14.

The cross-bar 82 of the actuator bracket 74 is received within a generally C-shaped sliding mechanism 94, and a biasing member, such as the illustrated compression spring 98, supports the sliding mechanism 94. In its undeflected condition, the compression spring 98 lifts the actuator bracket 74, truck 14, and shoe 18 upwardly, as will be discussed in more detail below. The sliding mechanism 94 is interconnected with a support structure 102, for example in a vertical track 104 or the like, to permit the sliding mechanism 94 to slide vertically, but to prevent the sliding mechanism 94 from moving left or right in FIG. 3.

A pivot pin 106 pivotally interconnects the cross-bar 82 to the sliding mechanism 94, and the actuator bracket 74 is free to pivot about the pivot pin 106 as permitted by the clearance between the ends of the cross-bar 82 and the inside of the C-shaped sliding mechanism 94. However, the cross-bar 82 of the actuator bracket 74 is captured within the C-shaped sliding mechanism 94 such that the actuator bracket 74 may not move left or right as seen in FIG. 3.

The support structure 102 extends over the sliding mechanism 94 and the sealing mechanism 10, and supports an actuator 110. The actuator 110 may include, for example, a pneumatic cylinder. The actuator 110 includes a linearly extendable and retractable arm or piston 114 having a ball-and-socket type end 118. The ball-and-socket end 118 abuts the top of the base 78 of the actuator bracket 74. The actuator 110 is selectively actuable to push down on the actuator bracket 74 and deflect the biasing member 98 to its deflected condition. The ball-and-socket end 118 permits the actuator 110 to apply such downward force to the actuator bracket 74, even as the actuator bracket 74 pivots on the pivot pin 106 (as indicated with arrow 122 in FIG. 2).

With reference to FIGS. 2 and 3, the sealing mechanism 10 is used to seal a cover tape 126 to a carrier tape 130. The carrier tape 130 includes side flanges 134 and serially spaced compartments 138 that extend along a longitudinal axis 140 and are positioned between the flanges 134. The compartments 138 are adapted to contain parts 142, which may be, for example, microprocessors, computer chips, circuit boards, or any other electrical or mechanical components. The cover tape 126 is laid over the carrier tape 130 and includes lines or strips of adhesive running along the longitudinal extent of the cover tape 126 and extending along the flanges 134 of the carrier tape 130. The adhesive may be pressure-sensitive adhesive, which requires only pressure to activate it, or heat-sensitive adhesive, which requires heat and pressure to activate it. The rails 54, 58 of the shoe 18 and the flanges 38 of the truck wheels 30, 34 are aligned or coplanar with the lines of adhesive. The carrier tape 130 is supported at its flanges 134 by guide rails 146 under the sealing mechanism 10.

In operation, if the adhesive is the heat sensitive type, the heating element 46 is energized to generate heat and warm up the truck 14 and shoe 18. Both the truck 14 and the shoe 18 are preferably constructed of thermally conductive material and become hot enough to activate the adhesive. In its at-rest condition (i.e., when the actuator 110 is retracted), the spring 98 lifts the truck 14 and shoe 18 up off the carrier tape 130 and cover tape 126. The tape 126, 130 is pulled under the sealing mechanism 10 at a selected rate by a motor or other prime mover.

Once the tape 126, 130 is in motion, the actuator 110 extends the actuator arm 114, which applies a downward force to the actuator bracket 74 through the ball-and-socket end 118. This causes the actuator bracket 74, sliding mechanism 94, and sealing mechanism 10 to slide downwardly, which deflects or compresses the spring 98. In response to such downward movement of the sealing mechanism 10, the flanges 38 of the truck wheels 30, 34 sandwich the cover tape 126 and carrier tape flanges 134 against the guide rails 146.

Also, the front and rear rails 54, 58 come into contact with the cover tape 126, therefore, bringing the shoe 18 to rest on the cover tape 126. As mentioned above, the shoe 18 is free floating with respect to the truck 14 due to the pins 70 and oversize holes 66 in the shoe 18. Therefore the shoe 18 is free to ride up and down over any bumps in the cover tape 126 and carrier tape 130, even as the actuator 110 applies a substantially constant downward force on the truck 14. Additionally, the ball-and-socket end 118 of the actuator arm 114 and the pivot pin 106 connection permit the actuator 110 to apply a substantially constant downward force on the truck 14, even as the truck 14 pivots as it encounters bumps in the cover tape 126 and carrier tape 130. The ball-and-socket end 118 and pivot pin 106 therefore permit the cover tape 126 to be in substantially uninterrupted and continuous contact with the rails 54, 58 and wheels 30, 34.

The tape 126, 130 moves in a downstream direction 150 (FIG. 2). As the tape 126, 130 passes under the sealing mechanism 10, the lines of adhesive are warmed by the front rails 54 of the heating shoe 18. The front truck wheels 30 are also heated by conduction and convection and apply additional heat to the lines of adhesive, which activates the lines of adhesive. Then the tape 126, 130 is pulled under the front wheel 30, and the front wheel flanges 38 apply pressure to the adhesive and sandwich the cover tape 126 and carrier tape flanges 134 together against the guide rails 146. Once the molten adhesive cools and cures, the bond is complete.

The rear rails 58 of the shoe 18 and the rear wheel 34 of the truck 14 are provided as back up in the event the bond is not completed by the front wheel 30. The rear rails 58 of the shoe 18 apply heat which activates the adhesive, and the rear wheel 34 applies pressure to the adhesive to complete the bond. Additionally, if the taper machine through which the tape 126, 130 is moving is powered down during a run, the actuator arm 114 is retracted, which permits the spring 98 to lift the truck 14 and shoe 18 off the tape 126, 130. This prevents prolonged exposure of high heat to the tape 126, 130, and reduces the likelihood that the cover tape 126 will melt, warp, or otherwise be damaged by such prolonged exposure. In the event of such a shut-down, there may be incomplete bonding in the length of tape 126, 130 under the sealing mechanism 10. When the machine is again powered up and the sealing mechanism 10 is pressed down against the tape 126, 130, the rear rails 58 of the shoe 18 and the rear wheel 34 complete any such incomplete bonds.

If the adhesive is activated by pressure only, then the heating element 46 need not be activated. The illustrated sealing mechanism 10 may therefore be used for sealing both heat sensitive adhesive and pressure sensitive adhesive, and the sealing shoe 18 would not have to be switched out for a different sealing shoe when the adhesive is changed.

It should be noted that the sealing mechanism 10 may be adapted for use on all standard tapes 126, 130. There are several different widths of cover and carrier tapes 126, 130 in industry (e.g. 8 mm, 12 mm, and 16 mm) and the truck 14 and shoe 18 may be configured with wheels 30, 34 and rails 54, 58 of varying widths and spacings to ensure proper sealing.

Figure 5:
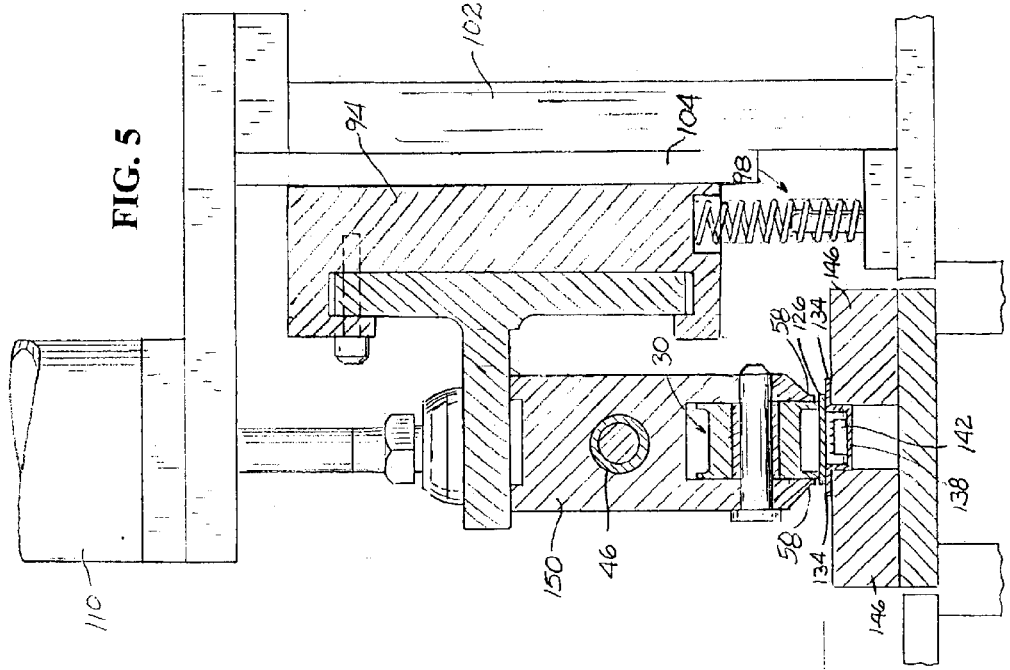
FIG. 5 is a section view taken along line 5—5 in FIG. 4.
Figure 4:
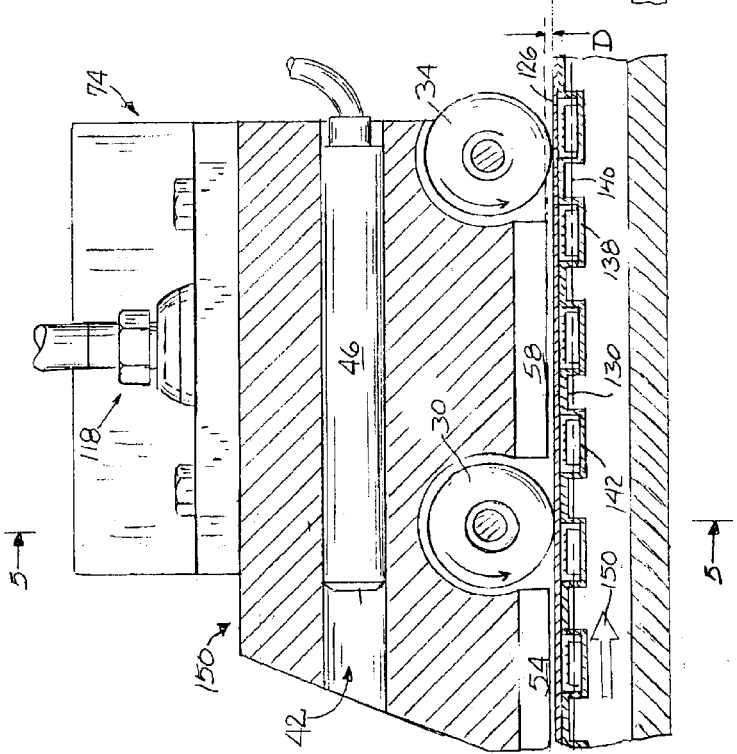
FIG. 4 is a section view of an alternative construction of the sealing mechanism.

FIGS. 4 and 5 illustrated an alternative construction of the sealing assembly. Where elements are similar to those described above, the same reference numerals are used. In this construction, the truck and shoe are integrally formed with each other as a single part 150. To facilitate bumps in the cover and carrier tapes 126, 130 in this construction, the support rails 54, 58 are positioned a fixed distance D from the cover tape 126. The distance D should be a minimum of 0.0005 inches to ensure proper functionality of the integral truck/shoe 150.

Figure 7:
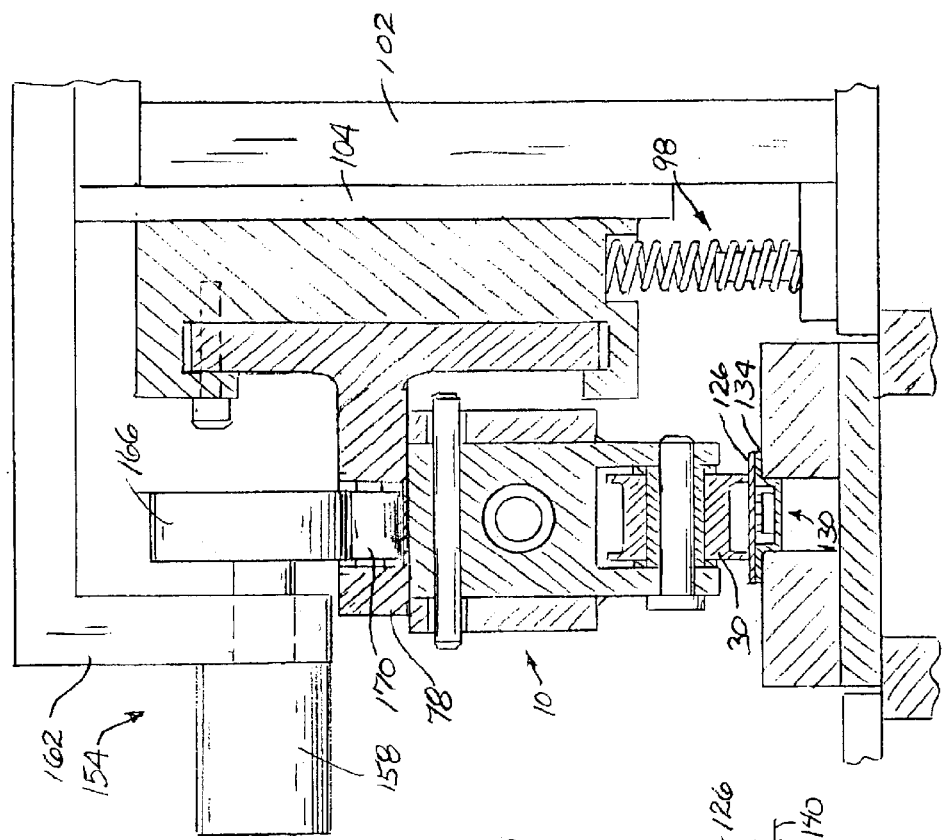
FIG. 7 is a section view taken along line 7—7 in FIG. 6.
Figure 6:
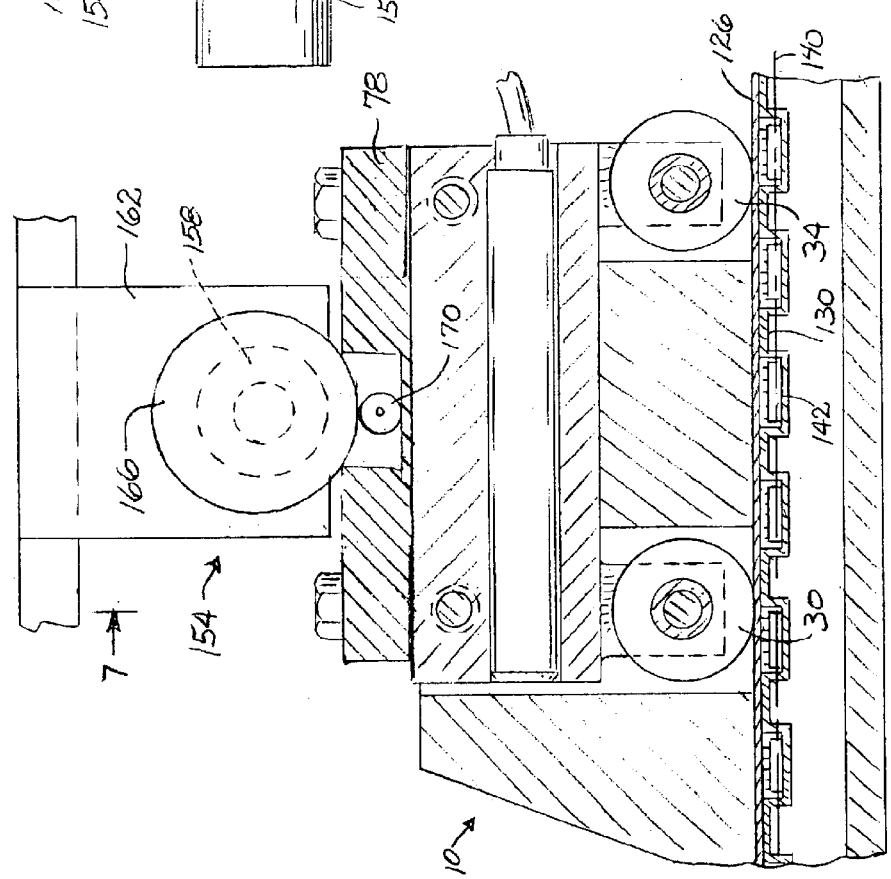
FIG. 6 is a section view of the sealing mechanism of FIG. 1 and an alternative construction of an actuator assembly.

FIGS. 6 and 7 illustrate an alternative actuator assembly 154 for use with the sealing mechanism 10 illustrated in FIGS. 1–3. It will be appreciated that, although not illustrated, the sealing mechanism 10 illustrated in FIGS. 4 and 5 may also be used with the actuator assembly 154 illustrated in FIGS. 6 and 7. This actuator assembly 154 utilizes a servo or stepper motor 158 operable in a forward and a reverse direction. The motor 158 is mounted to a modified version of the support structure 102 which includes a depending portion 162. Operably interconnected with the motor 158 is an eccentric or cam member 166. A wheel or roller 170 is rotatably mounted within the base portion 78 of the actuator bracket 74, and is in abutting relationship with the cam member 166.

The downward pressure applied to the carrier tape 130 and cover tape 126 through the wheels 30, 34 is a function of the direction and degree to which the motor 158 rotates the cam 166. The magnitude of downward pressure may therefore be closely controlled by a central processing unit in communication with the motor 158. As with the above-described embodiments, the actuator 158 may selectively remove the downward force, at which time the spring 98 lifts the truck/shoe member 150 off the tape 126, 130.

Although previously described constructions of the invention are described as including first and second sealing wheels 30, 34, a single sealing wheel or more than two sealing wheels can be utilized and still achieve the desired sealing effect and still be within the spirit and scope of the invention. The sealing wheels 30, 34 can alternatively be powered rather than passive. Powered sealing wheels would reduce the amount of tension required on the cover and carrier tapes 126, 130 during the sealing process, and therefore reduce the chance of the cover and carrier tapes tearing or breaking.

Sliding shoes, skids, or blades can be utilized in place of the sealing wheels 30, 34 described in the illustrated constructions. The sliding shoes would be mounted to the truck 14 in generally the same positions as the illustrated sealing wheels 30, 34, but they would not rotate. The sliding shoes would slide over the top of the cover tape 126 to seal the cover and carrier tapes 126, 130 together.

Alternatives to the heating element 46 can also be used and still be within the spirit and scope of the invention. For example heat pipes or heated wires can be utilized to direct heat to a predetermined area around the sealing wheels 30, 34. These heat pipes or wires will provide enough heat to the cover tape 126 to cause the adhesive thereon to become molten and the sealing wheel provides sufficient pressure to the cover and carrier tape 126, 130 to achieve the same heat-sealing results as the previous constructions.

Although a single sealing mechanism 10 is illustrated and described above, it should be appreciated that multiple sealing mechanisms 10 may be used in series if necessary. Also, multiple rows of cover and carrier tapes 126, 130 can run side by side with one another and, therefore, multiple sealing mechanisms 10 may be positioned side by side to seal the side by side rows of cover and carrier tapes 126, 130. Each of the side by side sealing mechanisms 10 may be connected to individual actuators 110 or all of the side by side sealing mechanisms 10 may be connected to a single actuator 110.

Although the illustrated embodiment shows the sealing mechanism 10 above the cover and carrier tapes 126, 130, it should be appreciated that the sealing mechanism 10 can be positioned below the cover and carrier tapes 126, 130 to seal the cover and carrier tapes 126, 130 from below. In such an embodiment, the front and rear rails 54, 58, and flanges 38 of the sealing wheels 30, 34 would contact or be positioned a distance below the carrier tape 130.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention as set forth in the appended claims.

What is claimed is:

1. An apparatus for sealing cover tape to carrier tape, at least one of the cover tape and carrier tape having adhesive disposed thereon, the carrier tape having a plurality of serially spaced compartments extending along a longitudinal axis of the carrier tape and sized for containing parts therein, the apparatus comprising:
   a shoe having a longitudinally extending rail positioned in close relation to the cover tape and disposed on a side of the serially spaced compartments;
   a pressure-applying member downstream of the rail and in contact with the cover tape; and
   an actuator selectively applying pressure through the pressure-applying member to the adhesive such that the adhesive bonds the cover and carrier tapes together on the side of the compartments.

2. The apparatus of claim 1, wherein the adhesive is heat sensitive type adhesive, said apparatus further comprising a heating element providing heat to the heating shoe such that the temperature-sensitive adhesive is heated by the rail before the actuator applies pressure to the adhesive through the pressure-applying member.

3. The apparatus as claimed in claim 2, wherein the rail contacts the cover tape.

4. The apparatus as claimed in claim 2, wherein the longitudinally extending rail is a first longitudinally extending rail of the shoe, the shoe further including a second longitudinally extending rail positioned in close relation to the cover tape and disposed on an opposite side of the serially spaced compartments from the first longitudinally extending rail, wherein the heating element provides heat to the second rail such that the adhesive is heated by the second rail, and wherein the actuator selectively applies pressure through the pressure-applying member to the adhesive that has been heated by the second rail such that the adhesive bonds the cover and carrier tapes together on the opposite side of the serially spaced compartments from the first rail.

5. The apparatus as claimed in claim 4, wherein the first and second longitudinally extending rails contact the cover tape.

6. The apparatus as claimed in claim 1, wherein the pressure-applying member includes a wheel having at least one flange operable to contact the cover tape, the flange of the wheel and the longitudinally extending rail of the shoe being substantially co-planar.

7. The apparatus as claimed in claim 1, wherein the longitudinally extending rail is a first longitudinally extending rail of the shoe, the shoe further including a second longitudinally extending rail positioned in close relation to the cover tape and disposed on an apposite side of the serially spaced compartments from the first longitudinally extending rail, and wherein the pressure-applying member includes a wheel having a first flange and a second flange substantially co-planar with the first longitudinally extending rail and the second longitudinally extending rail, respectively.

8. The apparatus as claimed in claim 1, wherein the longitudinally extending rail is a first longitudinally extending rail of the heating shoe, the heating shoe further including a second longitudinally extending rail, a third longitudinally extending rail, and a fourth longitudinally extending rail, the second rail being positioned in close relation to the cover tape and disposed on an opposite side of the serially spaced compartments from the first rail, the third rail being positioned downstream of the first rail and substantially co-planar therewith, the fourth rail being positioned downstream of the second rail and substantially co-planar therewith, and wherein the pressure-applying member includes a first rotatable wheel disposed between the first and third rails and between the second and fourth rails, and a second rotatable wheel downstream of the third and fourth rails and in contact with the cover tape, and wherein the actuator selectively applies pressure through the second wheel to the adhesive that has been heated by the third and fourth rails.

9. The apparatus as claimed in claim 1, wherein the shoe includes a cavity defined therein, the apparatus further comprising a truck interconnected to the shoe within the cavity, the truck including the pressure-applying member.

10. The apparatus as claimed in claim 9 wherein the pressure-applying member includes a wheel rotatably mounted to the truck.

11. The apparatus as claimed in claim 9 wherein the pressure-applying member includes at least one skid slidable over the cover tape.

12. The apparatus as claimed in claim 9 wherein the truck includes at least one bore therethrough, and wherein the shoe includes at least one aperture aligned with said bore, the apparatus further comprising a pin snugly fit in said bore and loosely fit in said aperture to allow the truck to move vertically with respect to the shoe.

13. The apparatus as claimed in claim 9, further comprising a heating element at least partially received within the truck and actuable to heat up the truck and shoe.

14. The apparatus as claimed in claim 9, wherein the actuator is interconnected to the truck.

15. The apparatus as claimed in claim 1, wherein the actuator selectively moves the shoe and pressure-applying member toward and away from the cover tape.

16. The apparatus as claimed in claim 1, wherein the pressure-applying member includes at least one of a rotatable wheel rollable over the cover tape, and a skid slidable over the cover tape.

17. An apparatus for heat sealing cover tape to carrier tape, at least one of the cover tape and carrier tape having temperature-sensitive adhesive disposed thereon, the carrier tape having a plurality of serially spaced compartments extending along a longitudinal axis of the carrier tape and sized for containing parts therein, the apparatus comprising:
a heating shoe for heating the adhesive, the heating shoe having a portion thereof disposed in close relation to the cover tape to heat the adhesive;
a pressure-applying member interconnected to the heating shoe; and
an actuator selectively applying pressure through the pressure-applying member to the adhesive that has been heated by the heating shoe such that the adhesive bonds the cover and carrier tapes together.

18. The apparatus as claimed in claim 17, further comprising a support structure, a sliding mechanism slidably connected to the support structure, and an actuator bracket connected to the sliding mechanism, the actuator bracket being interconnected with and between the heating shoe and the actuator, the actuator being operable to facilitate movement of the actuator bracket and the sliding mechanism toward and away from the cover tape.

19. The apparatus as claimed in claim 18, wherein the sliding mechanism includes a generally C-shaped slot and the actuator bracket includes a cross-bar, the cross-bar being receivable within the C-shaped slot and connectable to the sliding mechanism by a pin such that the actuator bracket can pivot about the pin with respect to the sliding mechanism.

20. The apparatus as claimed in claim 18, further comprising a biasing member positioned between the sliding mechanism and the support structure to bias the sliding mechanism, the actuator bracket, the heating shoe, and the pressure-applying member away from the cover tape, the actuator being operable to overcome the bias of the biasing member and move the sliding mechanism, the actuator bracket, the heating shoe, and the pressure-applying member toward the cover tape.

21. The apparatus as claimed in claim 17, further comprising an actuator bracket interconnected with and between the heating shoe and the actuator, the actuator including a motor and an eccentric cam member rotatably interconnected to and driveable by the motor, the actuator bracket including a roller rotatably connected thereto, the eccentric cam member being engageable with the roller of the actuator bracket and operable to rotate the roller upon rotation of the eccentric cam member.

22. The apparatus as claimed in claim 17, wherein the pressure-applying member includes a wheel rotatable with respect to the heating shoe and rollable over the cover tape.

23. The apparatus as claimed in claim 17, wherein the pressure-applying member includes a skid slidable over the cover tape.

24. A method of heat sealing cover tape to carrier tape, at least one of the cover tape and carrier tape having a temperature-sensitive adhesive disposed thereon, the carrier tape having a plurality of serially spaced compartments extending along a longitudinal axis of the carrier tape and sized for containing parts therein, the method comprising:
providing a heating shoe having a longitudinally extending rail positioned in close relation to the cover tape;
advancing the cover tape and the carrier tape along a guide member to a first position between the guide member and at least a portion of the rail;
heating the adhesive in the first position with the rail;
advancing the cover tape and carrier tape along the guide member to a second position between a pressure-applying member and the guide member, the pressure-applying member being downstream of the rail and having at least a portion inline with the longitudinally extending rail of the heating shoe; and
bonding the cover tape and carrier tape together with the adhesive by pressing the cover tape and carrier tape together between the guide member and the pressure-applying member in the second position.

25. The method as claimed in claim 24, further comprising providing a truck interconnectable to the heating shoe within a cavity defined in the heating shoe, and mounting the pressure-applying member to the truck.

26. The method as claimed in claim 25, further comprising providing a heating element at least partially received within the truck to provide heat thereto, the truck, the heating shoe, and the longitudinally extending rail being operable to conduct heat therethrough and transfer heat from the heating element to the adhesive.

27. The method as claimed in claim 25, further comprising providing an actuator selectively operable to apply pressure through the pressure-applying member to the adhesive that has been heated by the rail such that the adhesive bonds the cover and carrier tapes together and biasing the shoe and truck away from the cover tape in the event that the actuator experiences a loss of power.

28. The method as claimed in claim 24, wherein bonding includes providing an actuator, interconnecting the actuator to the pressure-applying member, and applying pressure to the adhesive through the pressure-applying member with the actuator.

29. The method as claimed in claim 28, wherein the pressure-applying member includes a wheel and wherein bonding includes rolling the wheel over the cover tape.

30. The method as claimed in claim 24, further comprising advancing the cover tape and carrier tape along the guide member to a third position between the guide member and at least a portion of a second longitudinally extending rail of the heating shoe, the second rail being positioned in close relation to the cover tape; and heating the adhesive in the third position with the second rail.

31. The method as claimed in claim 30, further comprising advancing the cover tape and carrier tape along the guide member to a fourth position between a second pressure-applying member and the guide member, the second pressure-applying member being downstream of the second rail and having at least a portion thereof inline with the second longitudinally extending rail of the heating shoe; and pressing the cover tape and carrier tape together between the second pressure-applying member and the guide member.

32. The method as claimed in claim 24, wherein heating the adhesive includes resting the heating shoe on the cover tape such that the weight of the heating shoe is transferred to the cover tape through the rail.

33. The method as claimed in claim 24, further comprising biasing the heating shoe and the pressure-applying member away from the cover tape in the event that the actuator experiences a loss of power.

34. A heat sealing mechanism comprising:
a heating shoe having a cavity and first and second rails at the bottom of the heating shoe and on opposite sides of the cavity;
a truck within the cavity and having first and second pressure-applying members in line with the respective first and second rails;
a heating element heating the shoe and truck;

an interconnecting assembly interconnecting the shoe and truck, but permitting vertical movement of the truck with respect to the shoe within a limited range of motion; and an actuator interconnected with the truck and operable to move the truck within the range of motion and to move the shoe and truck vertically when the truck reaches the end of the limited range of motion.

35. The mechanism as claimed in claim 34, wherein the pressure applying members include first and second flanges of a spool-shaped wheel rotatably mounted to the truck.

36. The mechanism as claimed in claim 34, wherein the pressure applying members include first and second skids fixed with respect to the truck.

37. The mechanism as claimed in claim 34, wherein the interconnecting assembly includes a bore defined through the truck, at least one aperture defined in the heating shoe and aligned with the bore, and a pin snugly fit in the bore and loosely fit in the at least one aperture.

38. The mechanism as claimed in claim 34, wherein the mechanism is adapted to seal the cover tape to the carrier tape, wherein the heating shoe rests on the rails on the cover tape, and wherein the actuator applies pressure to the cover tape through the pressure-applying member but does not apply pressure to the cover tape through the rails.

* * * * *